United States Patent [19]

Milazzo

[11] 4,311,231

[45] Jan. 19, 1982

[54] ACCUMULATING CONVEYOR

[75] Inventor: Carl J. Milazzo, Kenmore, N.Y.

[73] Assignee: Hohl Machine & Conveyor Co., Inc., Buffalo, N.Y.

[21] Appl. No.: 150,879

[22] Filed: May 19, 1980

Related U.S. Application Data

[63] Continuation of Ser. No. 875,219, Feb. 6, 1978, abandoned.

[51] Int. Cl.³ .............................................. B65G 13/07
[52] U.S. Cl. .................................. 198/781; 198/617; 198/790
[58] Field of Search ................ 198/781, 783, 790, 617

[56] References Cited

U.S. PATENT DOCUMENTS

| | | | |
|---|---|---|---|
| 1,883,426 | 10/1932 | Walter et al. | 198/790 |
| 2,827,153 | 3/1958 | Olk et al. | 198/790 |
| 3,563,365 | 2/1971 | Loberg | 198/790 |
| 3,612,248 | 10/1971 | Wallis | 198/781 |
| 4,133,425 | 1/1979 | Roach | 198/781 |

*Primary Examiner*—Jeffrey V. Nase
*Attorney, Agent, or Firm*—Christel, Bean & Linihan

[57] ABSTRACT

The drive member actuating rollers of an accumulating conveyor are independently supported by pneumatically inflatable tubing at a regulated pneumatic pressure engaging the drive member against the load carrying rollers to provide a drive force substantially no greater than that required to drive the load. Where the drive force is insufficient to overcome starting friction, the pneumatic pressure is periodically momentarily increased an amount sufficient to provide such drive force. In both cases, holdback force during accumulation is reduced to a minimum by matching the pressure of inflation to the drive force required for the load being conveyed, in a manner avoiding unnecessary excess drive force. In a long conveyor, the center section tubing is deflated during accumulation, to reduce holdback force.

5 Claims, 6 Drawing Figures

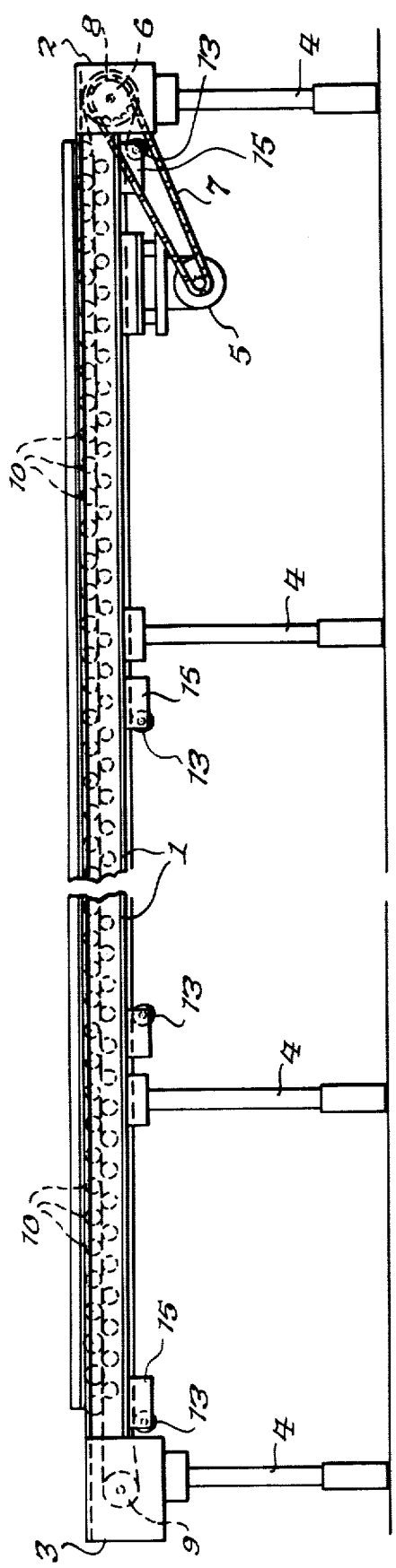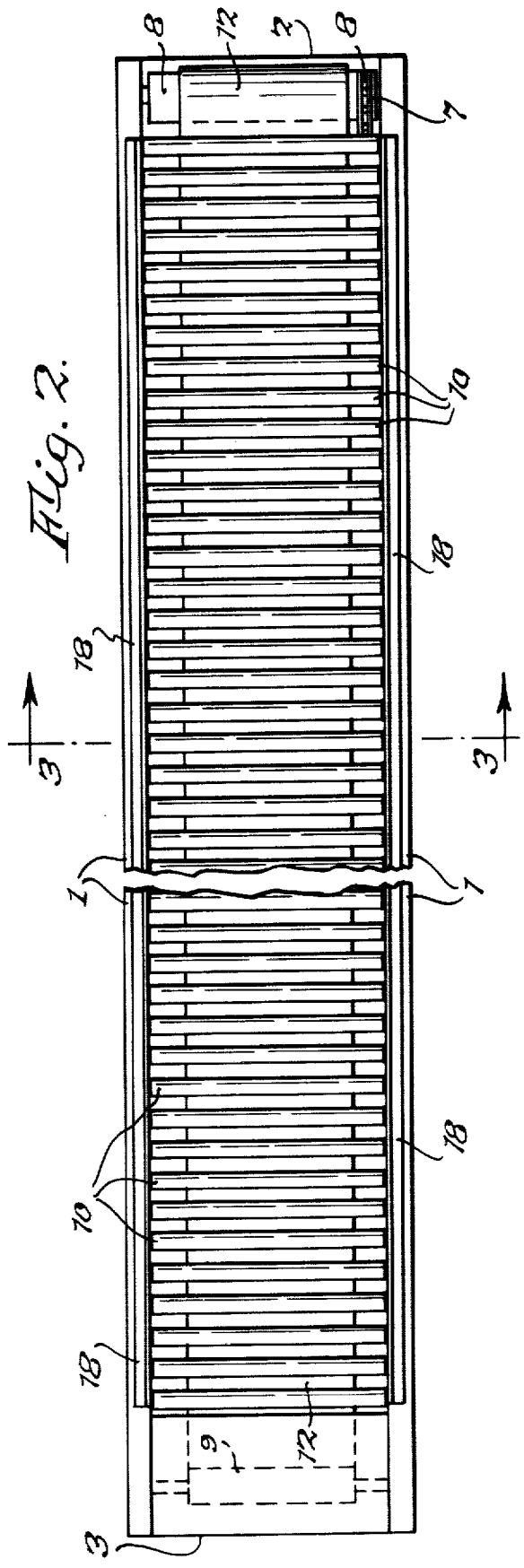

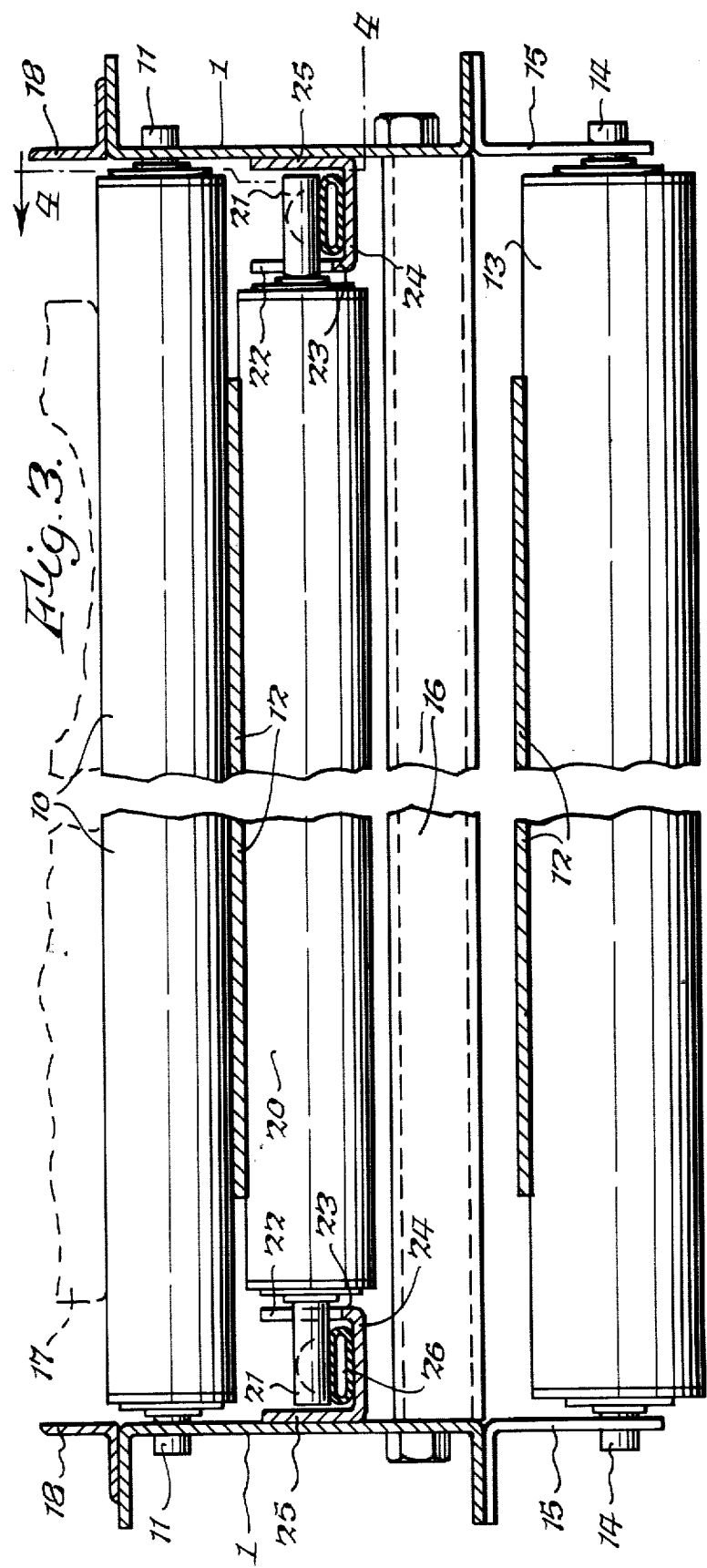
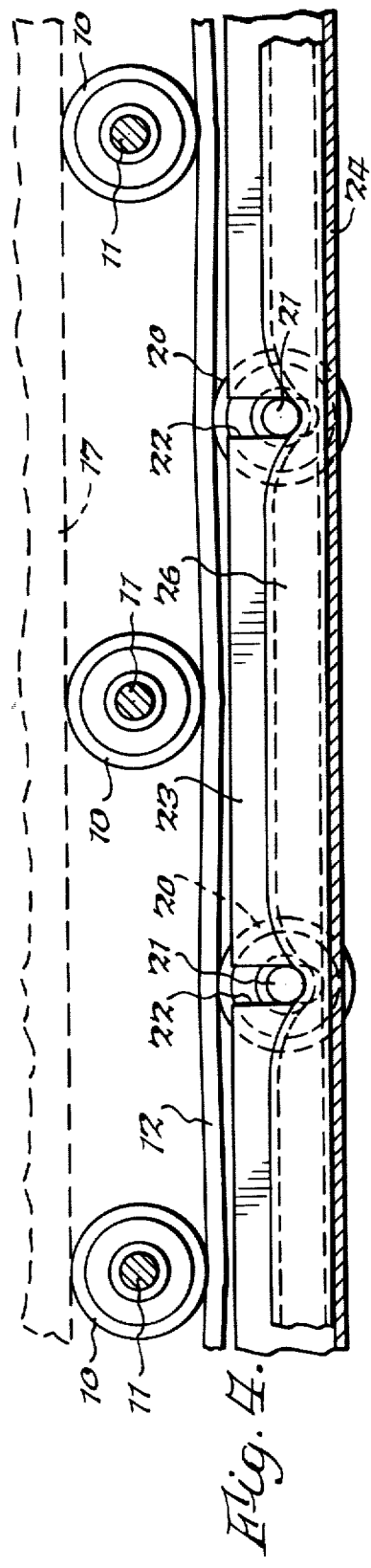

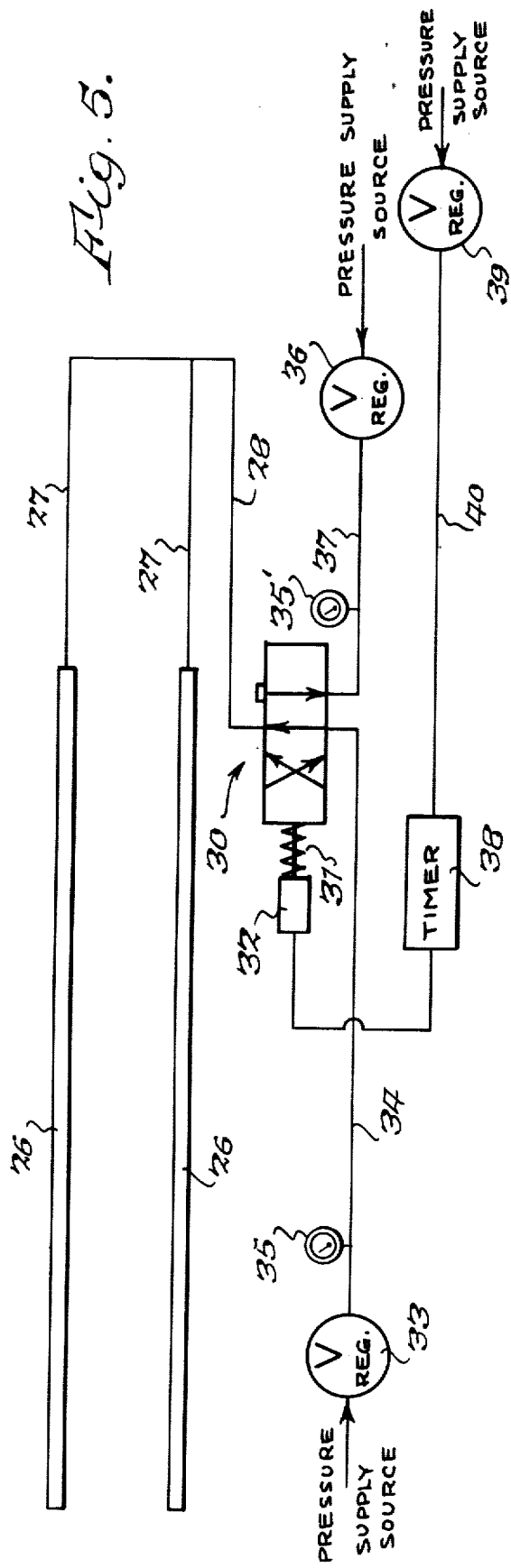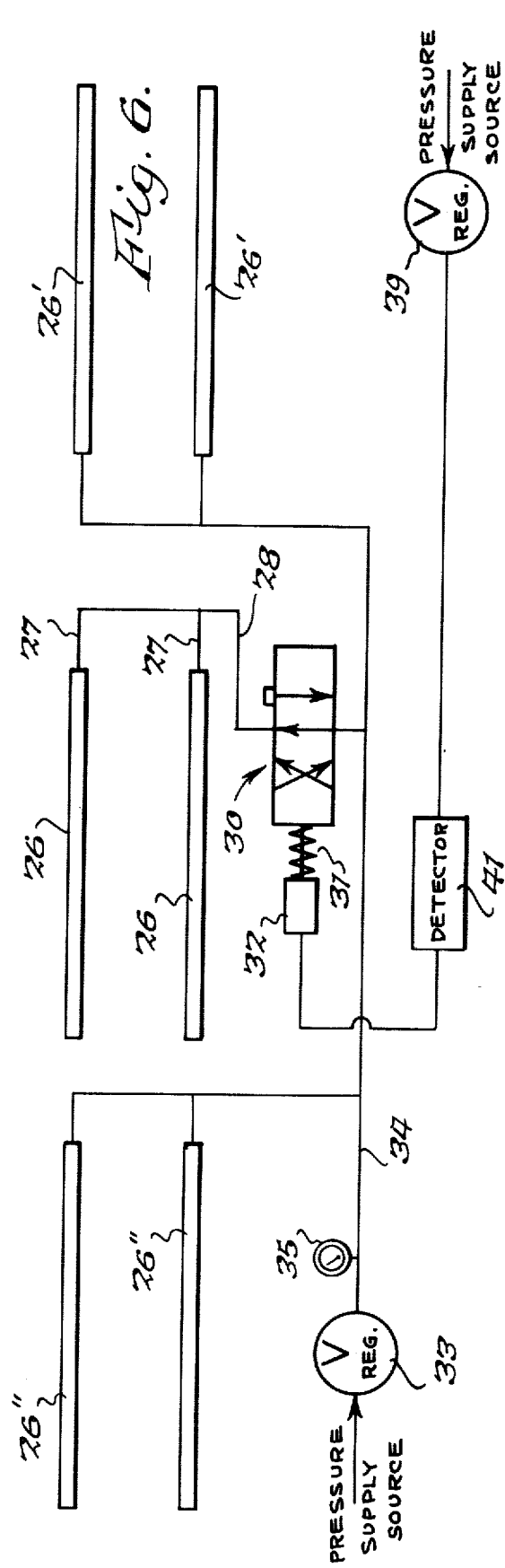

ACCUMULATING CONVEYOR

This is a continuation of application Ser. No. 875,219, filed Feb. 6, 1978, now abandoned.

BACKGROUND OF THE INVENTION

This invention relates to the accumulating roller conveyor art, and more specifically to a new and useful accumulating conveyor of the type having pneumatically actuated pressure rollers for engaging a drive belt against the load carrying rollers.

Conveyors of this general type are well known, as exemplified by U.S. Pat. Nos. 3,612,248 and 3,770,102 both of which show inflatable members for lifting actuating rollers to engage a drive member against the carrying rollers, disengagement occurring when the members are deflated. The instant invention is an improvement over such prior art conveyors in providing a closely controlled driving force which is selectively variable to match the requirements of a particular load without significant energy loss, as pointed out hereafter.

SUMMARY OF THE INVENTION

A primary object of this invention is to provide an accumulating conveyor having pneumatically actuated pressure rollers and which is selectively adjustable to accommodate a wide range of loads, from very light to extremely heavy, all with a minimum of holdback force, thereby conserving drive energy and the drive member during load accumulation.

This is accomplished with my invention by providing an arrangement wherein the actuator rollers are supported by inflatable members in conjunction with selectively adjustable controls providing pneumatic pressure to the inflatable members at a regulated pressure sufficient to impart the driving force necessary for the particular load being conveyed, without however substantially exceeding that force and the pneumatic pressure required to achieve the same, thereby reducing to a minimum the drive force which must be overcome during holdback.

The conveyor of my invention is further characterized by the independent support of the actuator rollers on the inflatable member, whereby dimensional variations in the actuator rollers resulting from manufacturing tolerances are accommodated by the inflatable member to provide a uniform driving force.

In yet another aspect thereof, the conveyor of my invention is characterized by the provision of selectively adjustable control means for maintaining a preselected pneumatic pressure in the inflatable member, sufficient to maintain movement of the load being conveyed but insufficient to overcome the starting force, with additional control means periodically energized to momentarily increase the pneumatic pressure an amount sufficient to overcome start up forces.

In still another aspect thereof, the conveyor of my invention is characterized by the provision of a center section of pneumatically supported actuating rollers operable independently of other sections, with control means operable to deflate the roller support and thereby disengage the drive member from the center section carrying rollers during accumulation of a load in the center section, thereby reducing the holdback pressure at the discharge end of the conveyor during load accumulation.

DESCRIPTION OF THE DRAWINGS

FIG. 1 is a side elevation of an accumulating conveyor constructed according to my invention, broken away to indicate variation in length, and with certain details omitted for clarity in illustration.

FIG. 2 is a top plan view of the conveyor of FIG. 1, similarly broken away.

FIG. 3 is a transverse sectional view taken about on line 3—3 of FIG. 2 but on an enlarged scale, broken away to indicate variation in width, the actuator roller supports being inflated and the conveyed load being indicated in phantom.

FIG. 4 is a fragmentary, longitudinal sectional view taken about on line 4—4 of FIG. 3.

FIG. 5 is a schematic illustration of a pneumatic control circuit for the conveyor of FIGS. 1-4.

FIG. 6 is a schematic illustration of another pneumatic control circuit for the conveyor of FIGS. 1-4.

DESCRIPTION OF THE ILLUSTRATION EMBODIMENTS

The accompanying drawings show an accumulating transfer conveyor comprising a supporting frame having opposite side rails 1 of generally channel shape cross section. End frame members 2 and 3 are secured to opposite ends of side rails 1 and are supported by legs 4, intermediate legs 4 also being provided as necessary. A suitable drive motor 5, mounted on the frame in a conventional manner, is connected to a drive pulley 6 by a chain drive 7. Drive pulley 6 is connected to a drive roller 8 suitably journaled for rotation in the end frame members 2 and an idler roller 9 is suitably journaled for rotation in the opposite end frame members 3.

A series of load carrying, article conveying live rollers 10 are provided, having stub shafts 11 at opposite ends thereof suitably mounted in side rails 1 for rotation of rollers 10 about the axis of the respective stub shafts 11. These can be conventional and the details thereof are not essential to the invention, it being understood that rollers 10 are journaled with a minimum of friction.

A drive belt 12 constitutes the drive member for rollers 10 and is trained about drive roller 8 and idler roller 9, belt 12 being supported on its return flight by rollers 13 having stub shafts 14 journaled in brackets 15 secured to the bottom of the frame side rails 1.

As thus far described, the conveyor construction can be of a conventional design, many details of which have been omitted for clarity and ease of illustrating and understanding the invention, such omitted details being well understood by those skilled in this art. The supporting framework can assume a variety of forms and constructions, and as shown in FIG. 3 can have cross brace members 16 extending between side rails 1 and secured thereto at spaced points.

The load is fragmentarily indicated at 17, and can be objects of a wide variety of shapes, sizes and weights, the conveyor of my invention being essentially unlimited in terms of its load carrying utility. Angle members 18 are secured to side rails 1 at the upper edges thereof, to guide and maintain the load on the conveyor.

Turning to the pneumatically actuated drive arrangement of this invention, drive belt 12 is engaged against the underside of load carrying rollers 10 by a series of spaced apart actuating rollers 20 journaled on stub shafts or axles 21 which extend axially from opposite ends of rollers 20 and seat freely in vertical slots 22 formed in the inner legs 23 of channel shaped support brackets 24 having outer legs 25 welded or otherwise secured to side rails 1.

Brackets 24 extend substantially the full length of the conveyor, from the actuating roller adjacent the inlet end to the actuating roller adjacent the outlet end, and each support bracket 24 contains, in the bottom of its channel, an elongated, normally collapsed, flat line pneumatic hose 26 on which the actuator roller axles 21 rest, whereby each actuator roller 20 is directly supported at its opposite ends by the hoses 26, independently of the other actuator rollers 20. Hoses 26 can be of reinforced neoprene, or any other suitable resiliently expandible material capable of withstanding the loading thereon. In the collapsed condition of hoses 26 actuating rollers 20 drop, to an extent such that drive belt 12 is removed from driving engagement with live rollers 10. However, as hoses 26 are inflated, they lift actuating rollers 20 against drive belt 12 to engage drive belt 12 against live rollers 10 with a degree of frictional force related to the pneumatic pressure in hoses 26. In other words, the greater the pneumatic pressure in hoses 26, the greater the drive force between belt 12 and rollers 10, and vice versa.

It is a particular feature of this invention that the driving force between belt 12 and rollers 10 can be carefully controlled by selecting and then regulating the pneumatic pressure in hoses 26, thereby avoiding any excess drive force to be overcome when the load is accumulating on the conveyor. Looking at the schematic diagram of FIG. 5, each hose 26 is supplied via conduit 27 and a common conduit 28 from a common pressure supply source. A solenoid controlled valve 30 having a spring 31 biasing a solenoid 32 to maintain the position shown in FIG. 5 causes both hoses 26 to be supplied with compressed air from a source through an adjustable regulating valve 33 and a conduit 34. Valve 33 can be of any commercially available type, for example the relieving type Watts air line regulator R 10-02 made by the Watts Regulator Company of Lawrence, Mass., which can be adjusted to provide a selected pneumatic pressure and is operable automatically to maintain the selected pressure which is visually indicated by a pressure gauge 35. For a relatively light load, a low pressure setting will be used and the pressure will be increased when a heavier load is being conveyed. All of this can be worked out in advance and the conveyor operator provided with a chart setting forth the pneumatic pressures to be provided and maintained for various load weights. The operator, knowing the weight of the load to be conveyed, simply adjusts regulating valve 33 to provide the pneumatic pressure required for that weight, the adjusted pressure being indicated on gauge 35, and the necessary drive force will result from the bearing engagement of actuator rollers 20 against drive belt 12 and of drive belt 12 against live rollers 10.

The pneumatic pressure in hoses 26 can be selected to provide enough driving force to maintain movement of the load and also to overcome starting friction, but essentially no more, in which case regulator valve 33 and gauge 35 are all that is required. Because drive force in excess of that required to overcome starting friction is avoided, the driving force to be overcome during accumulation is held to a minimum. However, hoses 26 also can be inflated substantially only to the pressure required to maintaining movement of the load, but insufficient to overcome starting friction, which has the beneficial result of even further reducing the driving force to be overcome as the load accumulates. In that case, to start an accumulated load moving the pressure in hoses 26 is momentarily increased, essentially just enough to overcome starting friction, with the normal pressure of inflation being less, essentially only enough to continue driving a moving load. For this purpose, a second adjustable regulating valve 36, which can be like valve 33, is set for the required slightly higher pressure indicated by a gauge 35'. Valve 36 periodically communicates with hoses 26 via conduit 37 by periodically, momentarily shifting valve 30 from the position shown in FIG. 5 to an alternate position using regulating valve 36 as the control. Such shifting can be regulated by an adjustable timer mechanism 38 of any suitable conventional design which is operable automatically to momentarily drive solenoid plunger 32 against spring 31 by admitting pressure fluid through regulating valve 39 and conduit 40. Valve 39 can be like valve 33, set to provide the pneumatic pressure required to shift plunger 32. The time interval during which valve 30 is shifted to provide the higher pressure is selected to be substantially only long enough to start the load moving, which typically is but a minor fraction of the total time during which the conveyor is operating, and is adjustable to accommodate differing loading conditions.

While a single continuous hose is shown on each side of the conveyor, it will be appreciated that multiple hose sections can be provided, each connected to a common regulated supply so that they will be inflated to the same selected pressure, to provide a uniform drive force. Actuator rollers 20 are independently supported by hoses 26, whereby any variations in size between rollers, resulting for example from manufacturing tolerances, will be compensated for by the resilience of the individual pneumatic support provided the rollers as contrasted, for example, with arrangements in which two or more rollers are caused to be moved in unison in which case dimensional variations between the rollers would not be compensated and different drive force pressures between rollers 20 and belt 12 could result.

In the case of a very long conveyor, hoses 26 can be provided in sections, as indicated in FIG. 6. For example, there can be an inlet end section 26', an outlet and section 26" and a central section 26 each of which communicates with a pressure supply source through a regulating valve 33 as described in connection with FIG. 5 whereby all three sections will be inflated to the same pre-selected pressure. While the circuit of FIG. 6 also could be provided with means for momentarily increasing pressure to overcome starting friction, as described in FIG. 5, the arrangement as shown in FIG. 6 contemplates maintaining a pre-selected pressure just sufficient to overcome starting friction, again without imposing any unnecessary driving force on the conveyor. As previously noted, such an arrangement also can be provided where the conveyor is not divided into sections.

When a load accumulates on a very long conveyor there is considerable driving force to overcome, even if the driving force is carefully selected to be only that which is required to drive the load and overcome starting friction. Therefore, in the arrangement of FIG. 6 whenever a load accumulates in the center section, it will be sensed by a detector, schematically indicated at 41, which can be a pneumatic sensing system, photo cell activated, or of any suitable, conventional type the details of which are known to those skilled in this art. Upon detecting the presence of an accumulated load in center section 26, detector 41 will admit pressure fluid under control of regulator 39 to drive the solenoid plunger 32 against spring 31, shifting valve 30 to deflate the center section hoses 26. The opposite end section hoses 26', 26" will remain inflated, but the driving force to the live rollers 10 in the center section will be relieved, as long as the load is accumulated in that section, thereby relieving the total drive force to be overcome and conserving energy. Deflating the center section hoses 26 by shifting valve 30 does not affect the inflation of the end section hoses 26', 26" which remain inflated at the pre-selected pressure determined by regulator 33 and indicated by guage 35.

When the load no longer is accumulating, detector 41 is operable to permit spring 31 to restore valve 30 to the position shown in FIG. 6, thereby inflating the center section hoses to the pre-selected pressure.

Accordingly, it is seen that my invention fully accomplishes its intended objects. There is provided an extremely simple and relatively inexpensive arrangement by means of which the actuator rollers are independently supported, accommodating any variations therein, engaging the drive belt against the live rollers with just enough pressure to drive the load. The pressure can be enough to overcome starting friction, or insufficient to overcome starting friction while being capable of maintaining movement of the load in which case means are provided for periodically, momentarily increasing the supporting pressure and resulting drive load to overcome starting friction of an accumulated load. In both cases, the pneumatic pressure and resulting drive force do not exceed what is required for the load being conveyed. In the case of a long conveyor, the center section can be disengaged during load accumulation. In all cases, energy is conserved and the cost of operation held to a desirable minimum because the drive force is very carefully limited by the selection of a regulated pneumatic pressure in the support hoses which is just enough to drive the selected load, the pressure being increased for heavier loads and decreased for lighter loads, in other words being selectively variable in a controlled manner to correspond to the load weight, as distinguished from simple on-off arrangements of the prior art. This significant result is obtained by avoiding both unnecessary drive friction to be overcome during accumulation and unnecessary excessive inflation of hoses 26 and consequent waste of pressurizing force.

I claim:

1. In an accumulating conveyor of the type having a supporting frame, a series of article carrying rollers journaled on said frame, endless drive means, and actuating rollers for engaging said drive means against said carrying rollers to impart a driving force thereto, the improvement which comprises pneumatically inflatable support means supporting said actuating rollers and means for inflating said support means and thereby imparting to said carrying rollers a controlled driving force including selectively adjustable control means operable to maintain a selected pneumatic pressure within said support means substantially no greater than that required to drive the load being conveyed with minimum holdback force during accumulation of the load on said conveyor, wherein said means for inflating said support means include first control means operable to maintain a normal driving force sufficient to maintain movement of the load while being insufficient to overcome starting friction, and second control means operable to momentarily increase the driving force by an amount sufficient to overcome starting friction.

2. The combination of claim 1, wherein said inflatable support means independently support said actuating rollers.

3. The combination of claim 1, wherein said second control means are operable to momentarily increase the driving force automatically at pre-set time intervals.

4. The combination of claim 3, wherein said first control means include selectively variable pressure regulator valve means operable to maintain a preselected pneumatic pressure in said support means over a pressure range encompassing both relatively high and relatively low pressures thereby adapting said conveyor to accommodate a corresponding load range encompassing both relatively heavy and relatively light loads, and wherein said second control means includes selectively variable pressure regulator valve means operable to increase the preselected pneumatic pressure in said support means by an amount sufficient to overcome starting friction, valve means normally placing said support means in communication with said first control means and out of communication with said second control means, and timer means periodically operable to momentarily shift said valve means to place said support means in communication with said second control means.

5. In a method of imparting driving force to article carrying rollers of an accumulating conveyor of the type having endless drive means engagable against said carrying rollers by actuator rollers supported on inflatable support means, the improvement which comprises, adjusting the inflation pressure of the support means to match the load being conveyed and thereby provide a driving force substantially no greater than that required to drive the load with a minimum holdback force during load accumulation wherein the adjusted inflation pressure is adjusted to provide a driving force sufficient to maintain movement of the load and insufficient to overcome starting friction, together with the step of periodically momentarily increasing the inflation pressure to momentarily correspondingly increase the driving force by an amount substantially no greater than that required to overcome starting friction.

* * * * *